United States Patent [19]
Yamashita et al.

[11] Patent Number: 5,568,397
[45] Date of Patent: Oct. 22, 1996

[54] LOGIC CIRCUIT DIAGRAM EDITOR SYSTEM

[75] Inventors: Keiichirou Yamashita, Yokohama; Akihiro Uchida, Kawasaki, both of Japan

[73] Assignee: Hitachi, Ltd., Tokyo, Japan

[21] Appl. No.: 271,649

[22] Filed: Jul. 7, 1994

[30] Foreign Application Priority Data

Jul. 8, 1993 [JP] Japan ................................. 5-169304

[51] Int. Cl.⁶ .................................................. G06F 17/50
[52] U.S. Cl. .......................................... 364/491; 364/488
[58] Field of Search ..................................... 364/488, 489, 364/490, 491, 578

[56] References Cited

U.S. PATENT DOCUMENTS

| | | | |
|---|---|---|---|
| 4,970,664 | 11/1990 | Kaiser et al. | 364/488 |
| 5,034,899 | 7/1991 | Schult | 364/488 |
| 5,038,294 | 8/1991 | Arakawa et al. | 364/491 |
| 5,164,908 | 11/1992 | Igarashi | 364/491 |
| 5,164,911 | 11/1992 | Juran et al. | 364/578 |
| 5,220,512 | 6/1993 | Watkins et al. | 364/489 |
| 5,353,234 | 10/1994 | Takigami | 364/489 |
| 5,371,683 | 12/1994 | Fukazawa et al. | 364/489 |

FOREIGN PATENT DOCUMENTS 3-22088   1/1991   Japan .

*Primary Examiner*—Vincent N. Trans
*Attorney, Agent, or Firm*—Fay, Sharpe, Beall, Fagan, Minnich & McKee

[57] ABSTRACT

A logic circuit diagram editor system is used for editing a logic circuit diagram displayed on a CAD system. When a terminal is selected, the logical connection is determined for that terminal with respect to another terminal that is selected. When it is determined that the selected terminals are not the same, the user can input a signal name to be used in common for both terminals. Upon entry of the signal name, the system sets a logical connection between the selected terminals and stores the connection information in memory. If it is determined that an obstruction exists between the selected terminals, or if it is determined that the terminals are on separate pages of a multi-page logic circuit diagram, then each terminal is displayed with the signal name in its vicinity, but the terminals are not shown on the screen to be diagrammatically connected. Also, if a circuit exists between the terminals, then no connection is drawn between them and the terminals are respectively labeled with the signal name. Otherwise, the terminals are shown to be diagrammatically connected by a line and the signal name is displayed between the terminals along the connection.

13 Claims, 8 Drawing Sheets

LOGIC CIRCUIT DIAGRAM EDITOR SYSTEM

FIELD OF THE INVENTION

The invention relates to a logic circuit editor system and, in particular, to a logic circuit editor system for use with a computer aided design (CAD) system for setting a logic connection relationship between circuits of a logic circuit diagram.

In a conventional CAD system, having an engineering work station (EWS) or a personal computer, a logic circuit diagram editor is used for assigning a signal name to each terminal drawn in a logic circuit diagram. In particular, a desired terminal of a logic circuit displayed on a monitor can be selected by a designer and a signal name then assigned to the terminal. Such a system is disclosed, for example, in Japanese Patent Laid-Open Application No. 3-22088.

FIG. 11 shows the display of a logic circuit diagram that would be shown on the screen of a monitor in a CAD system. The logic circuit diagram includes pages or windows 1, 2 and 3, wherein page 1 has logic circuits 5, 6 and 7, page 2 has logic circuit 8, and page 3 has logic circuits 9, 10 and 11.

Logic circuits 5 and 6 on page 1 of the diagram have input terminals a and b, and output terminals c and d, respectively. Output terminals c and d are connected to input terminals e and f, respectively, of logic circuit 7. Logic circuit 8 on page 2 of the diagram has an input terminal h and an output terminal 1. Logic circuits 9 and 11 on page 3 of the diagram have input terminals j, m and output terminals k, n, respectively. For the following explanation, it is sufficient to note that logic circuit 10 has a plurality of input and output terminals.

When a signal name is to be entered for the above-mentioned terminals, the connection status for each terminal (with respect to other terminals) can be classified into one of the following three cases.

(1) Diagrammatically unconnected, functionally unconnected;

(2) Diagrammatically connected, functionally connected; and (3) Diagrammatically unconnected, functionally connected.

Designers encounter these cases when entering signal names in a logic circuit diagram. For example, suppose that a designer enters a signal name for the input terminal b of a circuit portion 12, shown in FIG. 11. The input terminal b is shown to be not currently connected, that is, the input terminal b is in a diagrammatically unconnected state and further there is no terminal to which the input terminal b is to be connected, so the input terminal b is in a functionally unconnected state as well. Accordingly, the designer selects, with a mouse for example, the input terminal b once from the screen and enters the signal name (E), for example, from a keyboard. In this example, the designer needs to select the terminal only once before the signal name is entered.

In another example, suppose that a signal name is to be entered for each of the output terminals c and e of a circuit portion 13 on page 1 of the diagram. In this example, the output terminal c and the output terminal e are connected with each other, that is, these terminals are diagrammatically connected and functionally connected according to case (2), above. To enter the signal name, the designer first selects output terminal c or input terminal e and then selects the other of these terminals and enters the signal name B, for example. Accordingly, the designer is required to perform two selecting steps before the signal name is entered.

As yet another example, suppose in a circuit portion 14 of FIG. 11 that a signal name is to be entered for output terminal g of logic circuit 7 and input terminal h for logic circuit 8. In this case the terminals are diagrammatically unconnected since the connection between these terminals cannot be illustrated as extending between different pages of the logic circuit diagram. However, these terminals are functionally connected, and therefore the case (3) mentioned above is applicable to this example. To input the signal name, the designer selects output terminal g of logic circuit 7 from the screen displaying page 1 of the diagram and then switches to a display on the screen of page 2 and selects input terminal h of logic circuit 8. After the terminal is selected in each instance, the signal name is entered, therefore the designer is required to select each terminal once and enter the signal name a total of two times.

As another example of case (3) mentioned above, suppose that a signal name is to be assigned for output terminal k of logic circuit 9 and input terminal m of logic circuit 11 in a circuit portion 15. Since an integrated circuit 10 exists between each of these terminals, the terminals are diagrammatically unconnected and functionally connected. As a result, the designer selects one of output terminal k and input terminal m and enters the signal name F, and then selects the other of these terminals and enters the signal name. Again, the signal name is entered after selecting each of the terminals so that the designer is required to twice select the terminals and enter the signal name an equal number of times.

As discussed in the foregoing, relationships of logic connections must be represented by directly diagrammatically connecting different terminals or assigning a common signal name for the different terminals when a conventional logic circuit diagram editor system is used.

SUMMARY OF THE INVENTION

It is an object of the invention to overcome the problems associated with the use of conventional logic circuit diagram editor systems wherein a common signal name must be assigned to each selected terminal to be connected if the terminals are shown on different pages, as indicated in the circuit portion 14 of FIG. 11 or if the terminals are shown on the same page of a logic circuit diagram, but there connection is obstructed by an intermediate object as shown in circuit portion 15. The problem with such a system, according to the prior art, is that if a mistake is made in entering a signal name for one of the terminals to be connected, the logic connection relationship between them cannot be established.

It is also an object of the invention to overcome the problems associated with conventional logic circuit diagram editor systems where there are three types of operations performed, resulting in connection states (1)–(3), mentioned above, for entering a signal name by decreasing the possibility of making an operator error while providing an efficient procedure for a designer to follow in the entering of signal names.

It is therefore an object of the present invention to provide a logic circuit diagram editor system that is simple to use and efficient in operation, as well as one that minimizes the potential for error in assigning signal names and sets forth logical connections within a logic circuit diagram in a CAD system.

By the present invention, according to one aspect thereof, a logic circuit diagram editor system has a memory unit for storing logic connection information of a logic circuit diagram with signal names of logic circuits and connections between terminals of the logic circuit diagram represented on a display device wherein pages of the diagram are displayed on a monitor. For the designer's use, input means, such as a mouse, are provided to indicate the terminals to be connected and to enable entering of the signal names. To assist in the connection procedure, a signal name entered through the input means by the designer is displayed in the vicinity of the corresponding terminals if the indicated terminals are not the same and there is some object between the terminals so that they cannot be diagrammatically connected. Then, the logic connection relationship between the terminals is set by logic determination means so that the terminals are functionally connected even though they are not diagrammatically connected.

In the present invention, if it is determined by the system that there is some object or blockage between a plurality of terminals, a signal name entered by the designer through the input means is shown in the vicinity of each terminal, so that only a single operation for entering a signal name for a plurality of terminals to each other is required.

In addition, the system determines whether terminals indicated by a designer through the input means are the same or not and, if they are the same, shows the signal name entered by the designer in the vicinity of the connection between each of the indicated terminals, i.e. at one position between the terminals on the display. On the other hand, if it is determined that the terminals are not the same, it is further determined whether there is some blockage between the terminals, and if there is no blockage, the system shows the signal name in the vicinity of each of the terminals, i.e. in two positions. Thus, regardless of whether there is some blockage or not between the terminals, the process of selecting the terminals and entering a signal name is performed in the same operation or step of the logic connection operation.

DETAILED DESCRIPTION OF THE PREFERRED EMBODIMENTS

Figure 1:
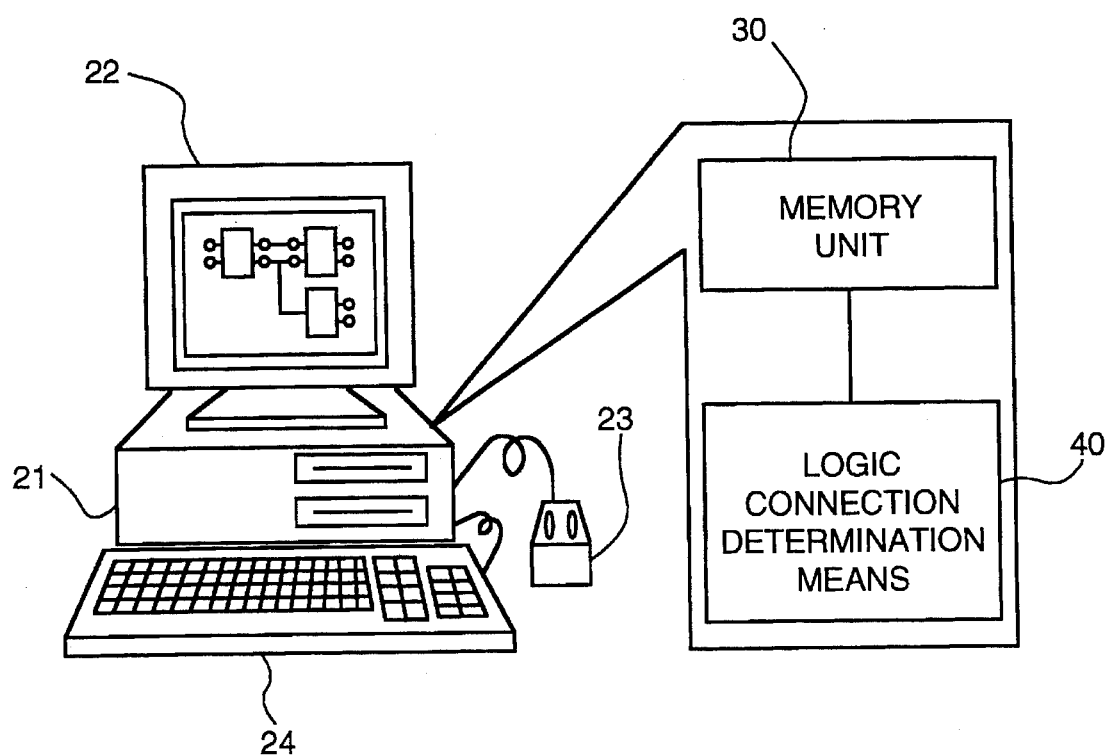
FIG. 1 is a diagram illustrating an overall diagram of the present invention.
Figure 2:
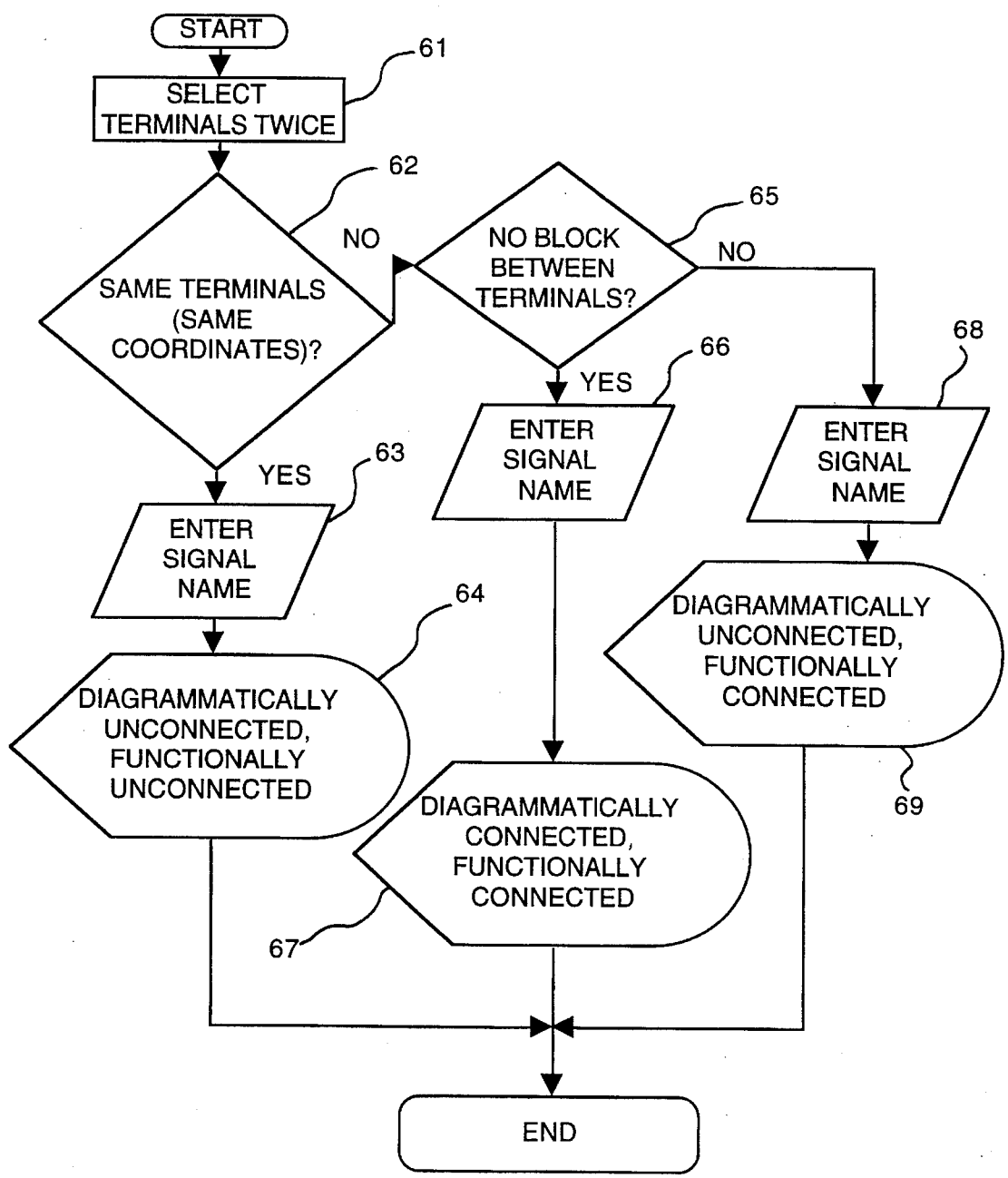
FIG. 2 is a flow chart explaining the operation of the invention according to an embodiment thereof.

The logic circuit diagram editor system of the present invention is implemented, for example, on a computer shown in FIG. 1 according to an operation shown by the flow chart of FIG. 2. Computer 21 has a memory unit 30 and a CPU for implementing logic connection determination means 40. A keyboard and a mouse 23 are provided for inputting information into the system. A screen display or monitor 22 is connected to computer 21 for displaying a logic circuit diagram to be edited by the system of the present invention. Also, system guidance information and other data is displayed on monitor 22.

Figure 10:
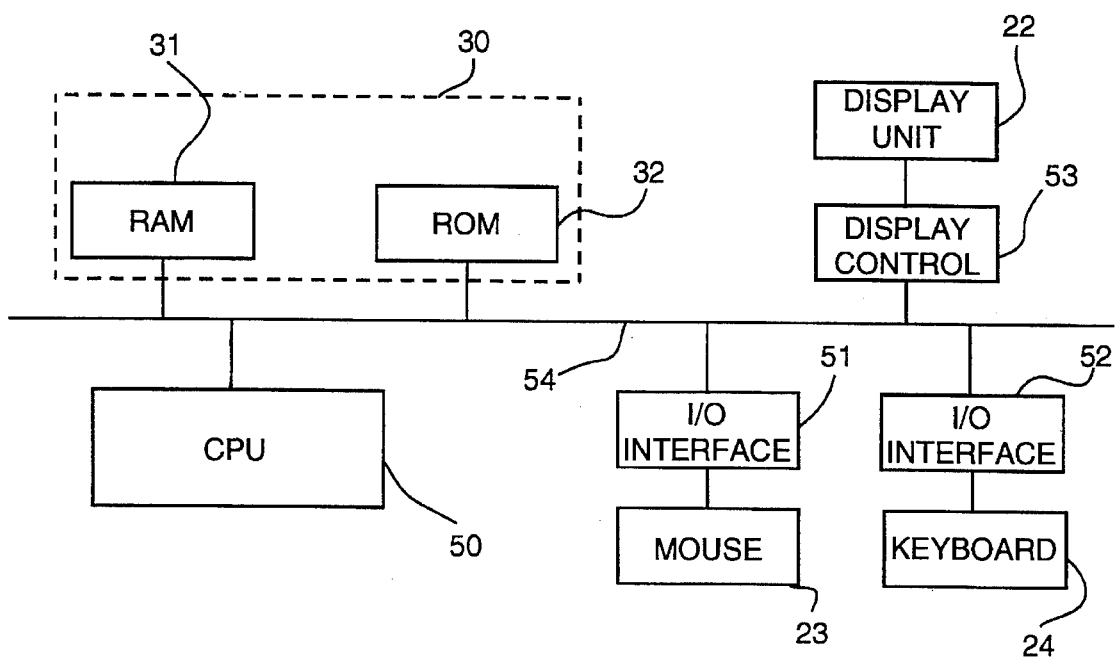
FIG. 10 is a diagram of the essential hardware components used in the system of the present invention.

In FIG. 10, a block diagram of the essential components of computer 21 are shown. The diagrammed arrangement is conventional and includes a CPU 50, memory unit 30, display control unit 53 and I/O interfaces 51 and 52. Display unit or monitor 22 is connected to bus 54 through display control 53; and mouse 23 and keyboard 24 are respectively connected to bus 54 through I/O interfaces 51 and 52. The memory unit 30 includes, for example, RAM 31 and ROM 32 and may include alternative memory devices, such as a hard disk drive, for example.

The system performs an editing operation on a logic circuit diagram displayed on monitor 22 in accordance with a control program stored in ROM 31, for example, that is executed by CPU 50. A flow chart of the operation is shown in FIG. 2. The operation shown in the flow chart of FIG. 2 implements the logic connection determination means 40. The RAM 32 stores information required for execution of the operation shown in FIG. 2, including logic connection information about circuit elements displayed in the logic circuit diagram, such as logic devices, terminals and signal lines previously designed, arranged, and in some cases, wired.

Figure 3:
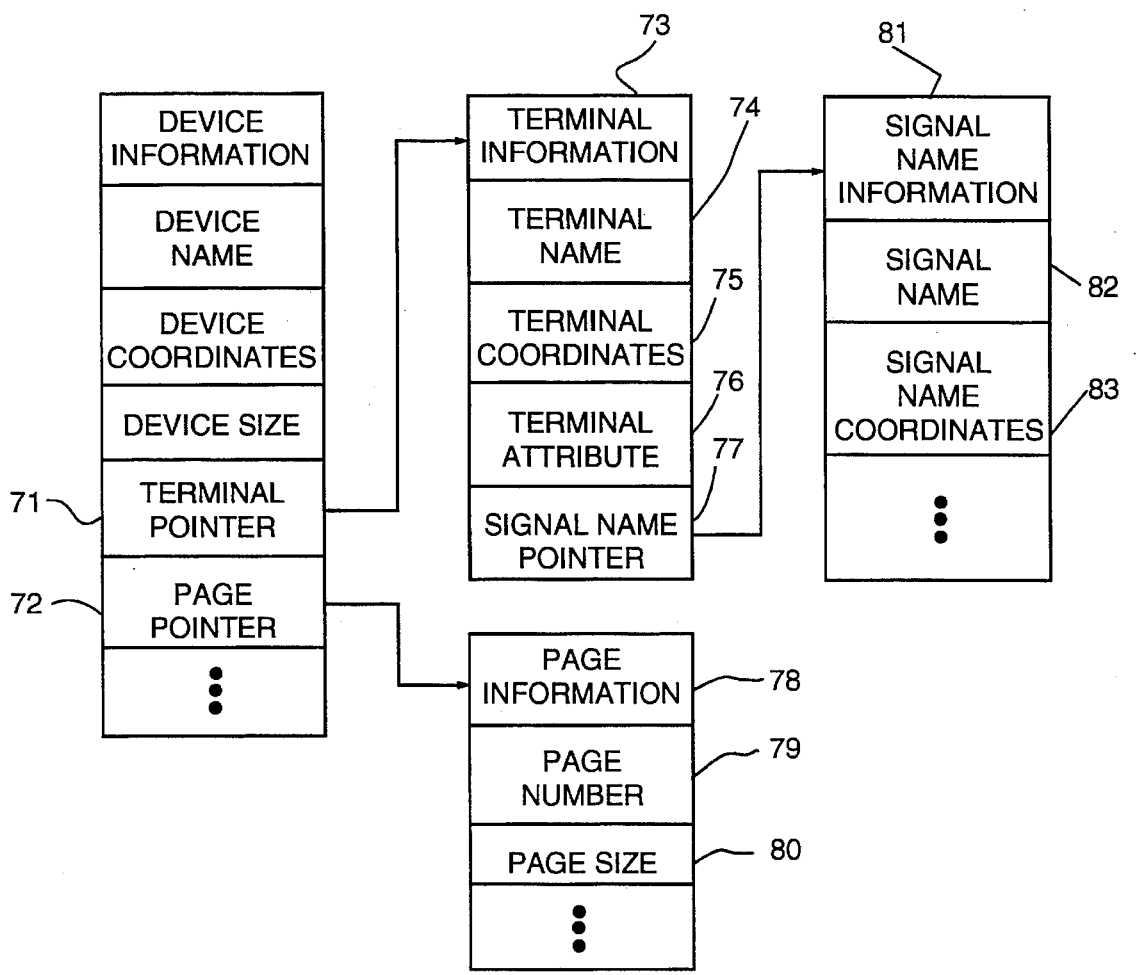
FIG. 3 is a diagram explaining the contents of information stored in memory of the system of the present invention.

The information stored in RAM 32 has a configuration set forth in FIG. 3, for example. Generally, the device information that is stored for each device includes a terminal pointer 71 and a page pointer 72, a device name and device coordinates. Terminal pointer 71 points at terminal information 73, which includes a terminal name 74, terminal coordinates 75, terminal attribute information 76, and a signal name pointer 77. The page pointer 72, on the other hand, points to page associated information 78, such as page number 79 and page size 80. The signal name pointer 77 points to signal name information 81, which includes signal name 82 and signal name coordinates 83.

Figure 4:
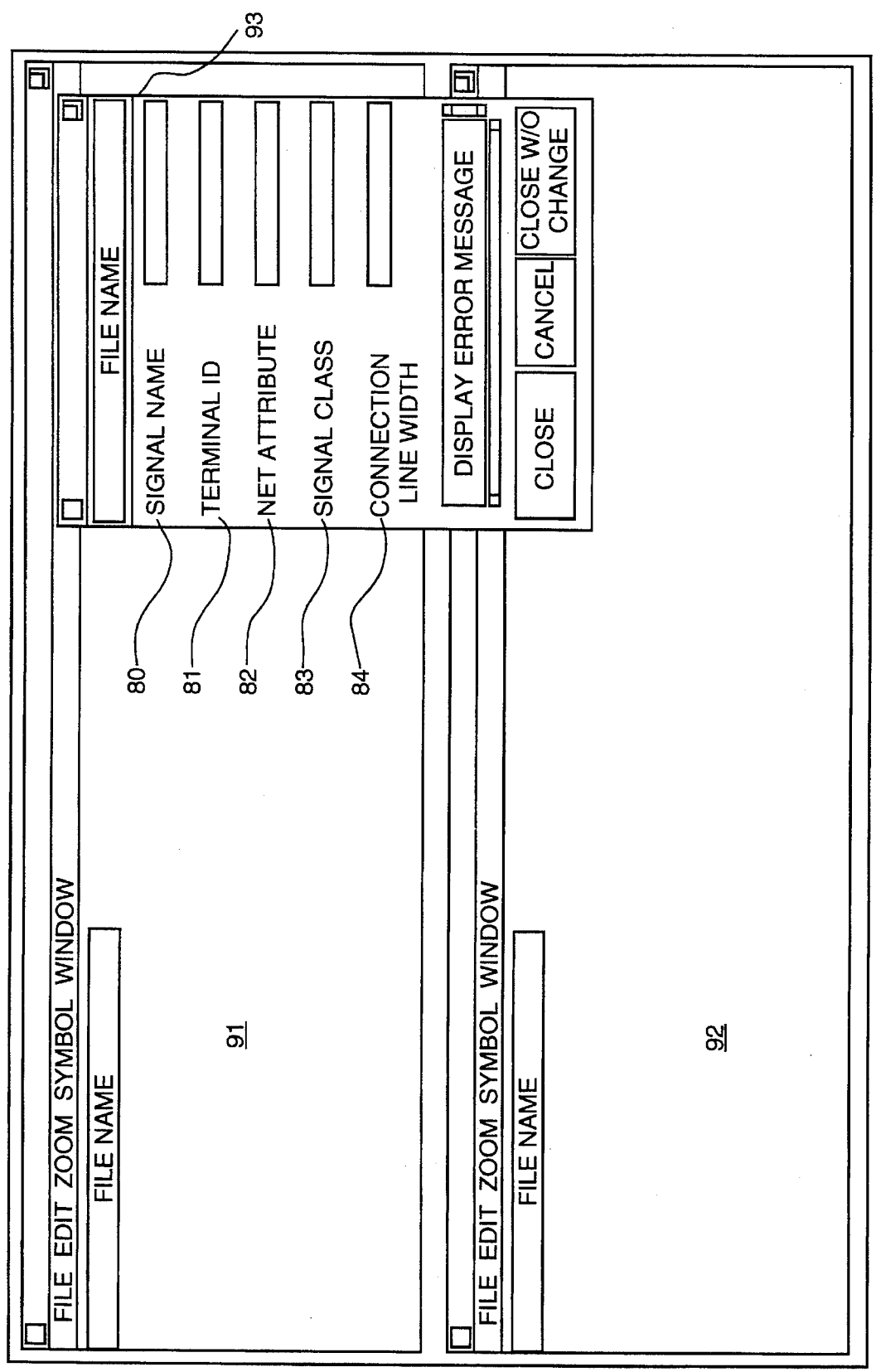
FIG. 4 is a diagram illustrating a window display used in the present invention.

The system of the present invention is designed for editing a logic circuit diagram and can be implemented in a windows display format, for example, as shown in FIG. 4. Two pages of a logic circuit diagram are respectively displayed in windows 91 and 92 of the monitor. An input menu 93 menu is displayed for permitting information to be entered into the system under the categories of signal name 80, terminal ID 81, net attribute 82, signal class 83 and connection line width 84, for example. Menu 93 also contains conventional display areas, such as an error message, etc.

A first operation of the present embodiment of the system of the invention is shown in FIG. 2. First, while looking at the logic connection information shown in the window display on monitor 22, a designer, for example through mouse 23, twice selects the same terminal for which a signal name is to be assigned or once selects two different terminals so that in either case two selection steps are performed with the mouse (step 61). Since the information concerning the logic circuit diagram to be edited by the system of the present invention has already been entered into the system, the CPU 50 is able to determine whether or not the two selected terminals (terminals with the same name or terminals with different names) are the same or not by considering the coordinates of the terminals that are selected.

Figure 11:
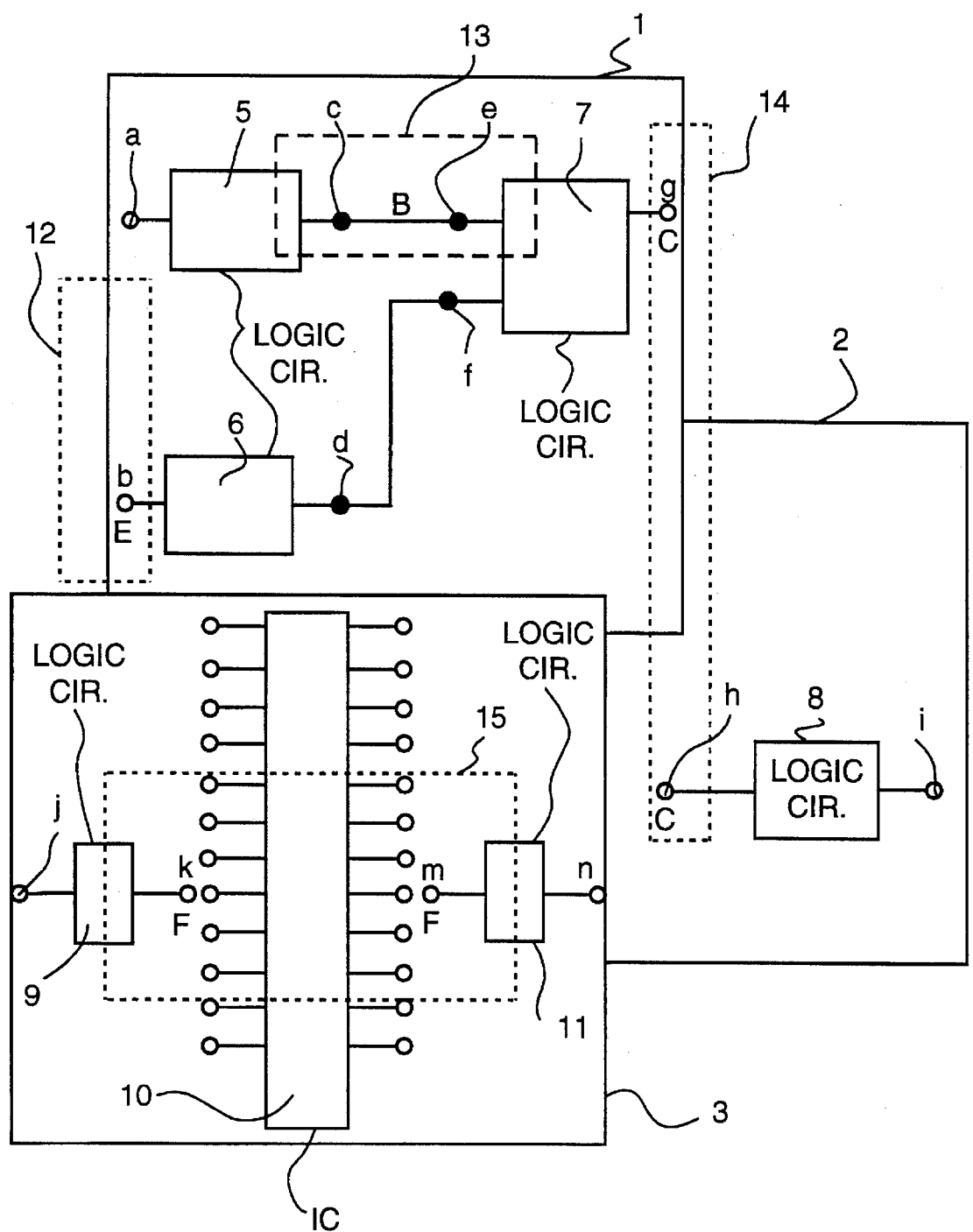
FIG. 11 is a diagram of an exemplary logic circuit diagram used for explaining the operations performed with the system of the present invention.

For example, with reference to the logic circuit diagram 1 of FIG. 11, input terminal b is displayed on the monitor 22 and is twice selected by the designer. The CPU then determines that the same terminal has been selected and shows, on the display 22, an input window, such as menu window 93 shown in FIG. 4.

Information including the signal name can be entered through menu window 93 by the user in step 63. The CPU 50, in response, recognizes entry of the signal name and stores the signal name in RAM 32. Also, the signal name is displayed on the logic circuit diagram 1 at the same time, providing a diagrammatically unconnected, functionally unconnected state wherein no logic connection relationship is set with any other terminal (step 64).

Returning to step 61 in FIG. 2, if CPU 50 determines that two different terminals have been selected, once each, the CPU 50 determines whether there is any block, i.e. blockage, obstruction between them or whether the terminals are on separate pages so that the terminals cannot be connected with a line on the logic circuit diagram (step 65). If the terminals c and e of FIG. 11 have been selected, for example, the CPU 50 determines that there is no block between them and shows on the display unit the menu window 93 for enabling the designer to continue with entering a signal name for the selected terminals.

In particular, based on an instruction given in the input windows, including menu window 93, the designer enters a signal name B, for example, from the keyboard. CPU 50, upon recognizing entry of the signal name B (step 63), stores the signal name B in RAM 32 and displays the signal name. A connection line is also displayed between the terminals c and d on the logic circuit diagram, and the logic connection relationship is stored in the memory unit 30.

Figure 5A:
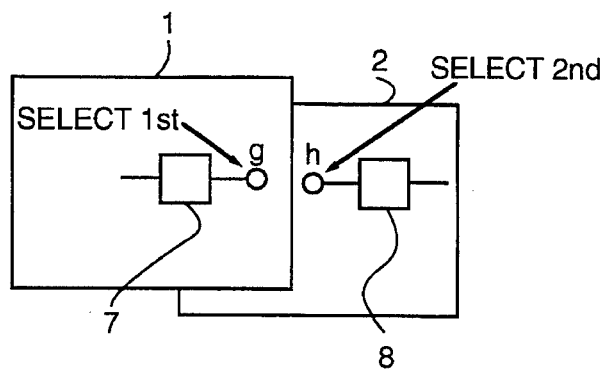
FIGS. 5(a) and 5(b) are diagrams for explaining an operation performed according to an embodiment of the present invention.
Figure 5B:
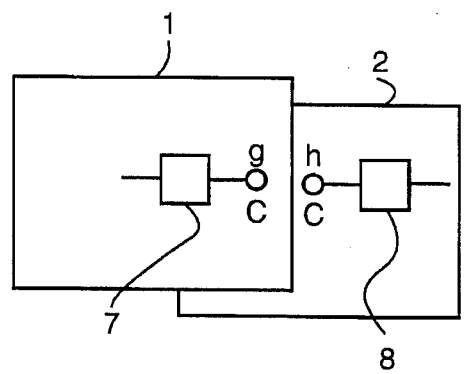

Referring to the situation shown in FIG. 5(*a*), terminals g and h (of circuit diagram portion 14, FIG. 11), are respectively selected and a determination made in step 65 that a block exists between the selected terminals. In this instance, the block would be that the respective terminals are on different pages. Following this determination, the menu window 93 would be displayed on monitor 22. From the menu window, the designer enters a signal name C from the keyboard and the CPU stores the signal name C in RAM 32. At the same time, as shown in FIG. 5(*b*), signal name C is displayed in the vicinity of the terminal g on page 1 of the logic circuit diagram and in the vicinity of the terminal h on page 2 of the logic circuit diagram. Also, a logic connection relationship is set in RAM 32 for these terminals, without displaying the connection between them diagrammatically (step 69). Accordingly, these terminals are diagrammatically unconnected and functionally connected.

A similar procedure is followed when terminals k and m, shown in logic circuit diagram portion 15 in FIG. 11, are selected since no connection line can be drawn between these terminals even though they are on the same page. In other words, the CPU determines that a block, i.e. integrated circuit 10, exists between the selected terminals (step 65). Then, when the CPU 50 recognizes entry of a signal name F through input menu window 93 (step 68), the CPU stores the signal name in RAM and displays the signal name in the vicinity of each of the terminals k and m. In this case, the logic connection relationship of these terminals is stored in RAM 32, but the terminals remain diagrammatically unconnected.

According to the above mentioned procedures, only two terminals selecting operations and one signal name entry operation are required for entering a signal name for the selected terminals and setting the logic connection relationship between them. Further, the display and logical connection status can be categorized into one of diagrammatically unconnected, functionally unconnected; diagrammatically connected, functionally connected; and diagrammatically unconnected and functionally connected. Since the required operations are the same for each of these states, the chance of erroneously entering a signal name is significantly minimized as compared with the prior art technique, and signal name entering operations can be performed efficiently and learned in a short amount of time by the designer or user of the system.

Figure 6A:
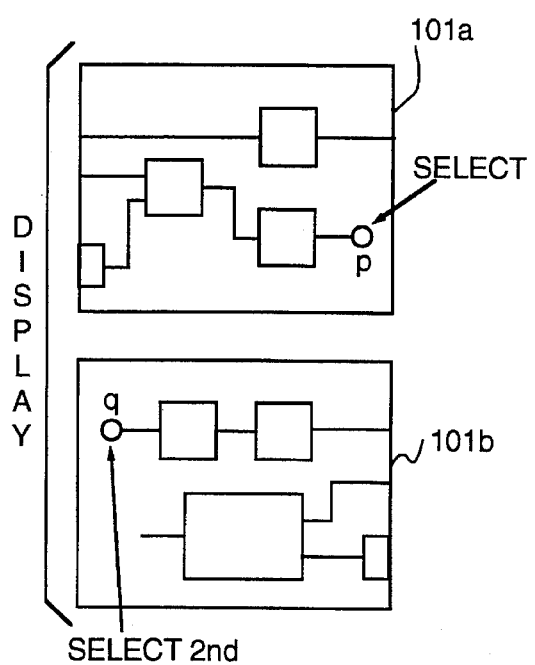
FIGS. 6(a) and 6(b) are diagrams for explaining an operation performed according to another embodiment of the present invention.
Figure 6B:
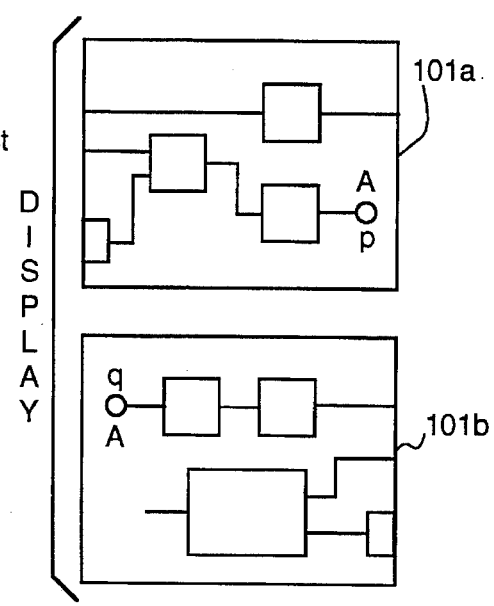

An example of using the editor system of the present invention is described with reference to FIGS. 6(*a*) and 6(*b*). If a logic circuit diagram is divided into a portion 101*a* and a portion 101*b* that are displayed in different windows as shown in FIG. 6(*a*), a selection of terminal p and a selection of terminal q (once each) causes CPU 50 to determine that there is a block between these terminals. As a result, CPU 50 displays input menu window 93 and waits for entry of a signal name.

If the user enters signal name A, for example, the CPU 50 stores the signal name A in the memory unit 30 and the signal name A is displayed in the vicinity of terminals p and q in windows 101*a* and 101*b*, respectively, as shown in FIG. 6(*b*). Also, the CPU sets the logic connection relationship between these terminals in memory unit 30 so that they are functionally connected, however, the terminals remain diagrammatically unconnected (step 69).

Figure 7A:
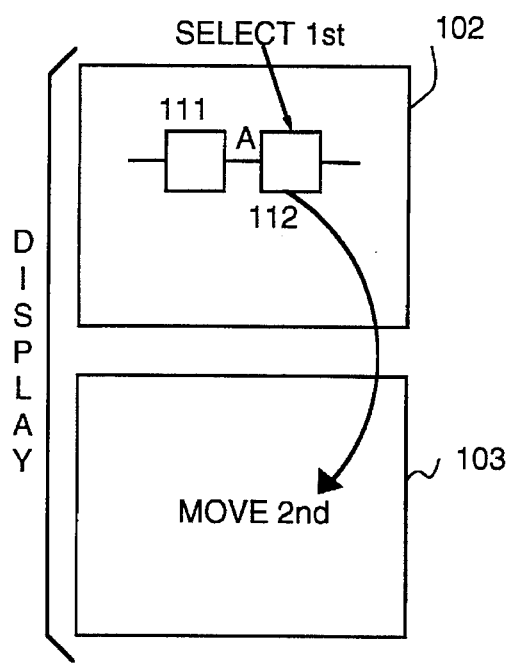
FIGS. 7(a) and 7(b) are diagrams for explaining an operation performed according to another embodiment of the present invention.
Figure 7B:
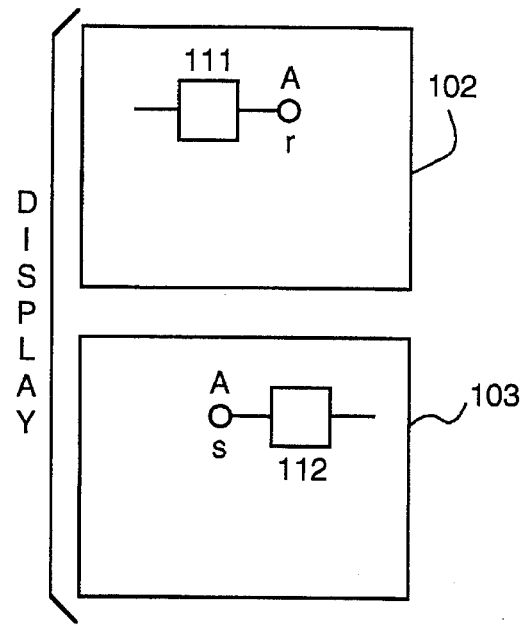

Another example of using the system of the present invention is shown in FIGS. 7(*a*) and 7(*b*), wherein logic circuits 111 and 112 are shown as part of a logic circuit diagram having windows or display pages 102 and 103. In this example, the user enters signal name A in menu window 93 and selects the logic circuit 112. Then, logic circuit 112 is moved over to logic circuit page display or window 103, as shown in FIG. 7(*a*). The resultant display after the move operation is shown in FIG. 7(*b*) wherein an output terminal r of the logic circuit 111 is displayed with the signal name A in window 102 and an input terminal s of the logic circuit 112 and the signal name A is displayed in the window 103. Thus, these terminals are set in the state of being diagrammatically unconnected and functionally connected. This relationship may be stored in memory unit 30.

Figure 8A:
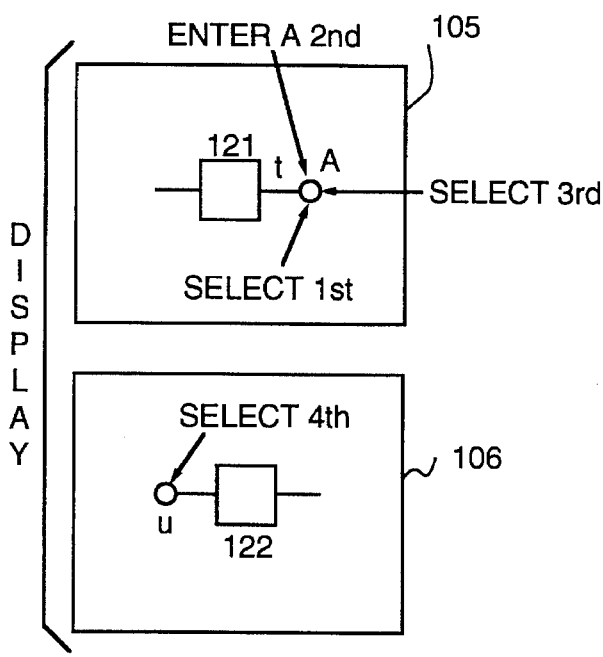
FIGS. 8(a) and 8(b) are diagrams for explaining an operation performed according to another embodiment of the present invention.
Figure 8B:
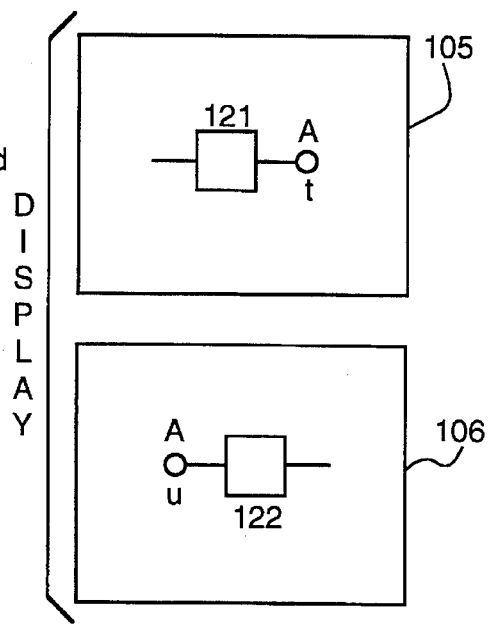

A further example of using the logic circuit diagram editor system of the present invention is shown in FIGS. 8(*a*) and 8(*b*). In page display or window 105, it is shown that a terminal t of logic circuit 121 is first selected and then signal name A is entered. The terminal t having the signal name A is then selected again followed by selection of the input terminal u for logic circuit 122 in logic circuit display page 106 (fourth selection). Prior to selecting input terminal u of logic circuit 122, the input terminal had an undefined signal name. After its selection, the signal name A is entered automatically and the logic connection relationship is set between the terminals t and u and stored in the memory unit. Accordingly, pages 105 and 106 are displayed as shown in FIG. 8(*b*) with each of terminals t and u labeled with signal name A, i.e. terminals t and u are in the diagrammatically unconnected, functionally connected state.

Figure 9A:
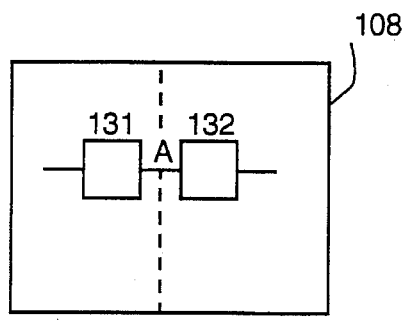
FIGS. 9(a) and 9(b) are diagrams for explaining an operation performed according to another embodiment of the present invention.
Figure 9B:
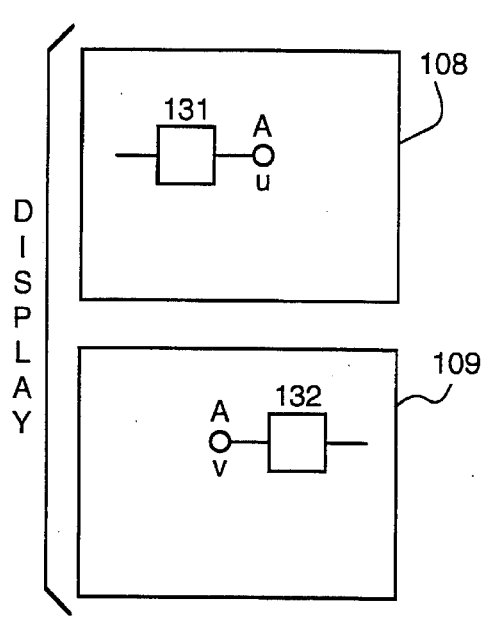

Yet another example of using the logic editor system of the present invention is shown in FIGS. 9(*a*) and 9(*b*). First, in FIG. 9(*a*), a signal name A is shown indicating a functional connection between logic circuits 131 and 132. Signal name A is entered by the user in a page dividing menu, not shown, selected by the user. Then, a dividing position, shown by the dashed line, is specified so that the dashed line passes over a portion of the display of the circuit diagram where the signal name A is displayed. The logic circuits 131 and 132 are then separated by a page dividing operation in accordance with instructions displayed in the page dividing menu, so that as shown in FIG. 9(*b*), the logic circuits 131 and 132 appear on pages 108 and 109, respectively. Specifically, an output terminal u of logic circuit 131 is displayed with signal name A and input terminal v of logic circuit 132 is displayed with signal name A in window 109. At the same time, a logic circuit diagram connection is stored in memory 130 as a diagrammatically unconnected, functionally connected pair of terminals.

By the present invention, the logic circuit diagram editor system enables a user to enter a signal name only once for any of the following categories of connections: diagrammatically unconnected, functionally unconnected; diagrammatically connected, functionally connected; and diagrammatically unconnected, functionally connected. This minimizes the chance of erroneously entering signal names and also minimizes the risk that a logic connection error is set between selected terminals caused by an erroneous signal name entry. Further, according to the present invention, the terminal indicating operation and signal name entering operation are performed in common for each of the above mentioned categories of connections so that the operation of the system is made efficient and can be learned by the user in a minimum amount of time.

We claim:

1. A logic circuit diagram editor system having a data processing unit and a display unit for displaying a logic circuit diagram, comprising:

a memory unit for storing logic connection information about a logic circuit diagram including terminal indicating data and signal name data for indicating logical connections between terminals of logic circuits within said logic circuit diagram;

input means for selecting said terminals displayed on said display unit to be connected in said logic circuit diagram and for entering signal names indicating a logical connection between terminals of said logic circuits; and said data processing unit having logical connection determination means for determining whether each of said selected terminals is the same and for automatically displaying a signal name entered by said input means in a vicinity of each of said selected terminals if said terminals are not the same, wherein said logical connection determination means further sets a logical connection relationship between said terminals without displaying a diagrammatic connection between said terminals.

2. A logic circuit diagram editor system according to claim 1, wherein said logic connection determination means, when said selected terminals are determined to be the same, displays a signal name entered by said input means in a vicinity of said selected terminal without diagrammatically connecting said selected pair of terminals, and without setting the logic connection relationship between said selected pair of terminals.

3. A logic circuit diagram editor system according to claim 1, wherein said logic connection determination means determines, if said selected terminals are found to not be the same, whether there is a block between said selected terminals, and if no block is found, displays a signal name entered by said input means in a vicinity of said connection between said selected terminals, connects said indicated terminals to each other diagrammatically so that they are displayed on said monitor as being connected together, and sets a logical connection between said selected terminals in said diagram that is stored in said memory unit.

4. A logic circuit diagram editor system according to claim 1, wherein said logical connection determination means displays said logic circuit diagram on a single display window and then divides said logic circuit diagram into a plurality of windows displayed on said display unit in response to an input command for dividing said logic circuit diagram.

5. A logic circuit diagram editor system according to claim 1, wherein when one of two logic circuits logically connected to each other and having a signal assigned with a common signal name is selected by said input means, said input means moves said one logic circuit to a different display window, and further automatically generates and displays a terminal and a signal name for each of said two terminals displayed on said separate windows.

6. In a CAD system having a display unit, a logic circuit diagram editor system for editing logical connections between logic circuits in a logic circuit diagram stored in said CAD system, comprising:

means for displaying portions of said logic circuit diagram in a plurality of windows displayed at one time on said display unit, including displaying at least one of terminals of said logic circuits and an indication of a logical connection between terminals of said logic circuits that includes a diagrammed connection between said terminals;

a memory unit for storing logic connection information between logic circuits within said logic circuit diagram including connections between said terminals of said logic circuits;

input means for selecting said terminals displayed in said windows on said display unit for indicating that said selected terminals are to be logically connected to one another and for inputting signal names, wherein said indication of said logical connection between said logic circuits includes a display of said signal names; and logical connection determination means for determining whether said selected terminals are the same, and if said selected terminals are not the same, setting and storing a logical connection relationship between said selected terminals as part of said connection information without displaying a diagrammatic connection between said selected terminals with said displaying means.

7. A logic circuit diagram editor system according to claim 6, wherein said input means selects one terminal displayed in one of said windows and another terminal displayed in another of said windows as said selected terminals.

8. In a CAD system having a display unit, a logic circuit diagram editor system for editing logical connections between logic circuits in a logic circuit diagram stored in said CAD system, comprising:

means for displaying portions of said logic circuit diagram in a plurality of windows displayed at one time on said display unit including displaying at least one of terminals of said logic circuits and an indication of a logical connection between terminals of said logic circuits that includes a diagrammed connection said terminals;

means for selecting said terminals of said logic circuits that are displayed by said displaying means;

means for inputting signal names for naming connections between said terminals of said logic circuits; and logical connection determination means including first means for determining whether two terminals selected by said selecting means are the same and second means for determining whether a predetermined condition exists that prevents a continuous diagrammed connection from being displayed between said selected terminals, wherein said logical connection determination means responds to a combination of a first selection of one said terminal and a second selection of a different said terminal determined to be different by said first determining means, followed by an inputting of a signal name with said inputting means, to automatically assign each of said first and second selected terminals with said inputted signal name when said predetermined condition is determined to exist.

9. A logic editor system according to claim 8, wherein said second determining means determines that said predetermined condition exists when said selected terminals are respectively displayed in different windows.

10. A logic editor system according to claim 8, wherein said second determining means determines that said predetermined condition exists when one of said logic circuits is displayed between said selected terminals.

11. In a CAD system having a display unit, a logic circuit diagram editor system for editing logical connections between logic circuits in a logic circuit diagram stored in said CAD system, comprising:

means for displaying portions of said logic circuit diagram in a plurality of windows displayed at one time on said display unit including displaying at least one of terminals of said logic circuits and an indication of a logical connection between terminals of said logic circuits that includes a diagrammed connection said terminals;

means for selecting said terminals of said logic circuits that are displayed by said displaying means;

means for inputting signal names for naming connections between said terminals of said logic circuits; and logical connection determination means including first means for determining whether two terminals selected by said selecting means are the same and second means for determining whether a predetermined condition exists that prevents a continuous diagrammed connection from being displayed between said selected terminals, wherein said logical connection determination means responds to a combination of a first selection of one said terminal with said selecting means, followed by an inputting of a signal name with said input means, a third selection of said one terminal with said selecting means and a fourth selection with said selecting means of a different one of said terminals, as determined by said first determining means, for automatically assigning said signal name to said different one of said terminals when said predetermined condition is determined to exist.

12. In a CAD system having a display unit, a logic circuit diagram editor system for editing logical connections between logic circuits in a logic circuit diagram stored in said CAD system, comprising:

means for displaying portions of said logic circuit diagram in a plurality of windows displayed at one time on said display unit including displaying said logic circuits and an indication of a logical connection between terminals of said logic circuit including a display of a signal name between said logic circuits;

a memory unit for storing logic connection information between logic circuits within said logic circuit diagram including connections between said logic circuits;

means for selecting logic circuits and terminals displayed in said windows on said display unit; and logic connection determination means responsive to selection of a first said logic circuit having a logical connection with a second said logic circuit and having a predetermined signal name displayed between said first and second logic circuits, followed by moving said first logic circuit to another of said windows, for displaying an output terminal for said second logic circuit in said one window and for displaying an input terminal for said first logic circuit in said another window and further for automatically assigning said predetermined signal name to each of said input and output terminals so that said displaying means displays said signal name in a vicinity of each of said terminals.

13. A logic circuit diagram editor system according to claim 12, wherein said first logic circuit is moved to said another of said windows by dividing said one window into two separate windows along a dividing line passing through said predetermined signal name.

\* \* \* \* \*